United States Patent [19]

Sticht

[11] Patent Number: 5,450,946
[45] Date of Patent: Sep. 19, 1995

[54] INSTALLATION FOR PROCESSING AND/OR ASSEMBLING COMPONENTS

[75] Inventor: Walter Sticht, Attnang-Puchheim, Austria

[73] Assignee: Stiwa-Fertigungstechnik Sticht Gesellschaft m.b.H., Attnang-Puchheim, Austria

[21] Appl. No.: 236,441

[22] Filed: May 2, 1994

[30] Foreign Application Priority Data

May 4, 1993 [AT] Austria .................... 861/93

[51] Int. Cl.⁶ .............................. B65G 15/10
[52] U.S. Cl. ....................... 198/817; 198/465.1
[58] Field of Search ............ 198/817, 803.01, 465.2

[56] References Cited

U.S. PATENT DOCUMENTS

| | | | |
|---|---|---|---|
| 2,432,024 | 12/1947 | Lipton | 198/817 X |
| 4,256,221 | 3/1981 | Lain | 198/461 X |
| 4,511,028 | 4/1985 | Meister | 198/817 X |
| 4,631,812 | 12/1986 | Young | 198/817 X |
| 4,754,867 | 7/1988 | De Anda | 198/817 X |
| 4,780,040 | 10/1988 | Petersen | 198/817 X |
| 5,009,306 | 4/1991 | Roderick et al. | 198/817 X |
| 5,125,140 | 6/1992 | Sticht | 29/33 P |

FOREIGN PATENT DOCUMENTS

| | | | |
|---|---|---|---|
| 0099556 | 2/1984 | European Pat. Off. | |
| 2543469 | 10/1984 | France . | |
| 2640593 | 6/1977 | Germany . | |
| 3134195 | 3/1983 | Germany . | |
| 0238562 | 8/1986 | Germany | 198/817 |
| 0023112 | 3/1981 | Japan | 198/817 |
| 0143805 | 8/1984 | Japan | 198/817 |
| 0143806 | 8/1984 | Japan | 198/817 |
| 0051407 | 3/1986 | Japan | 198/817 |
| 1587119 | 4/1981 | United Kingdom . | |
| 2235674 | 3/1991 | United Kingdom . | |

OTHER PUBLICATIONS

WO89/06177, published Jul. 13, 1989.

*Primary Examiner*—James R. Bidwell
*Attorney, Agent, or Firm*—Collard & Roe

[57] ABSTRACT

The invention describes an installation (1) for processing and/or assembling of components (2) with a conveying device (5, 6) connecting several workstations to one another, which, on a supporting frame (3) comprises a guidance device (13, 14) for a continuous surrounding conveying element (7, 8) with receptacles (15) for these components (2). This installation comprises parallel-running and at a preset distance (38) arranged guidance devices (13, 14) of at least two conveying devices (5, 6). The guidance devices (13, 14) or respectively the conveying devices (5, 6) are thereby secured by connecting devices (37, 134), in a direction extending transversely to the conveying direction, in a position at a distance (38) from one another.

39 Claims, 8 Drawing Sheets

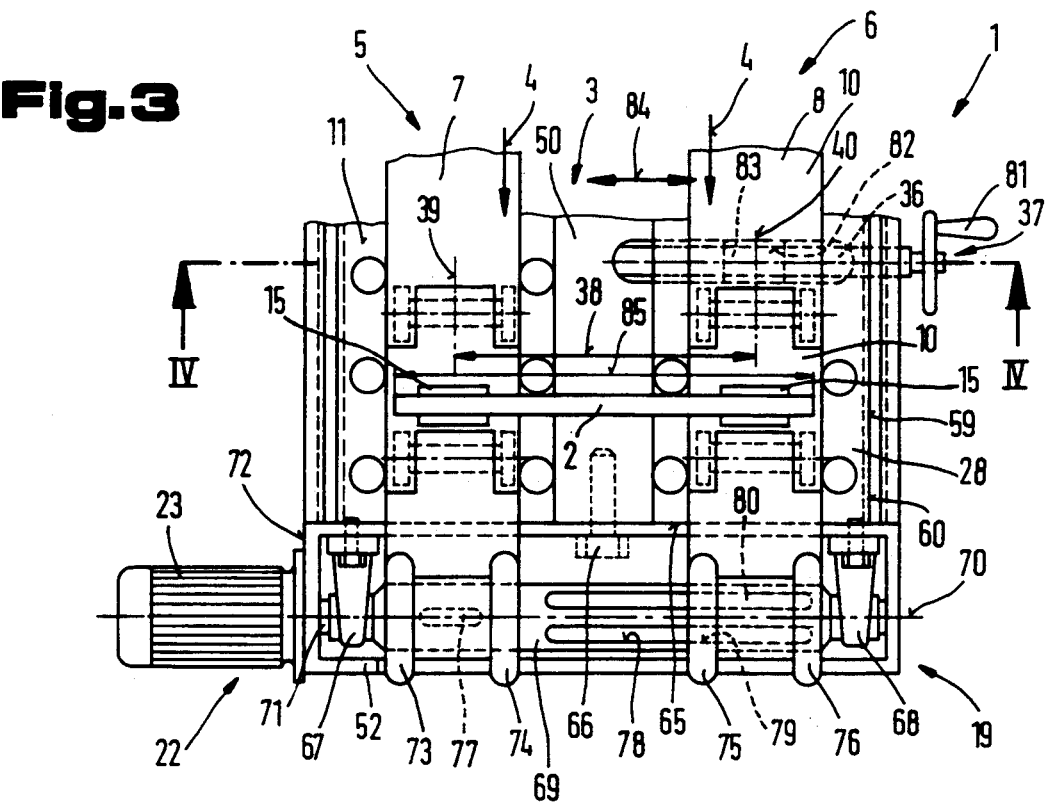
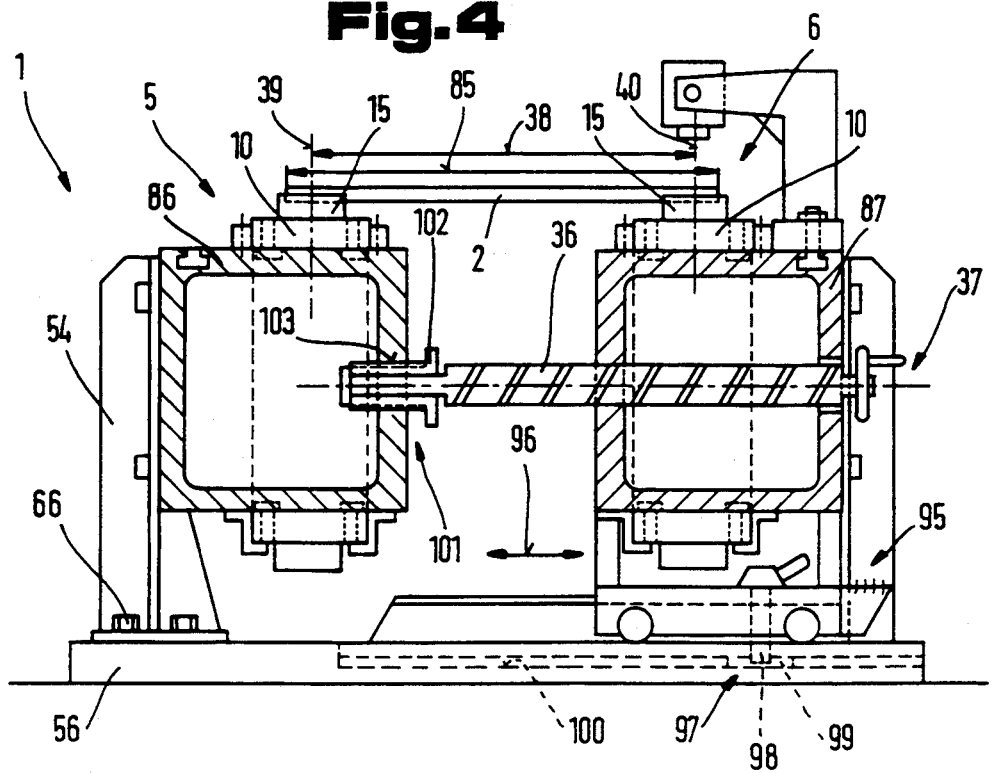

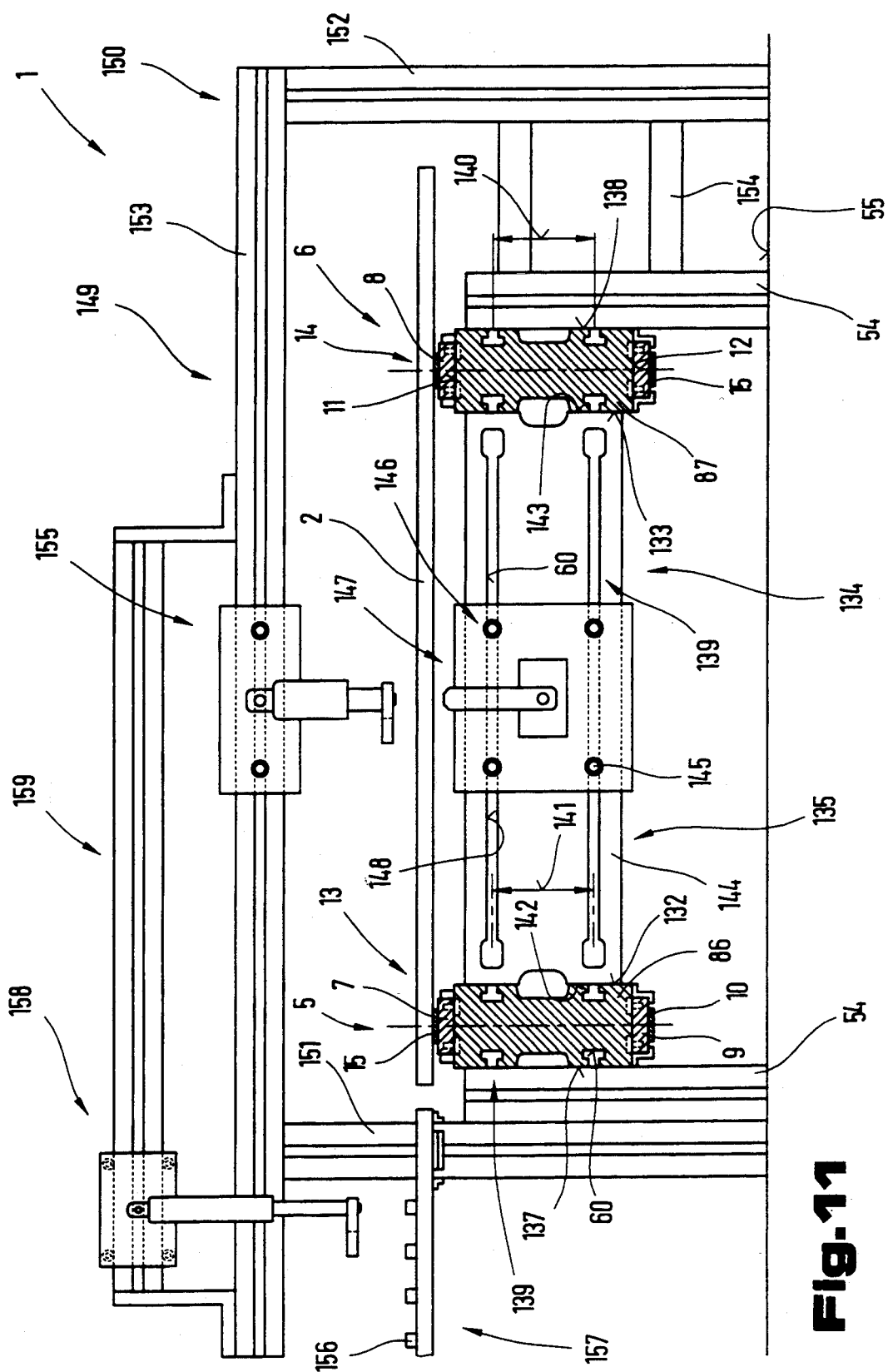

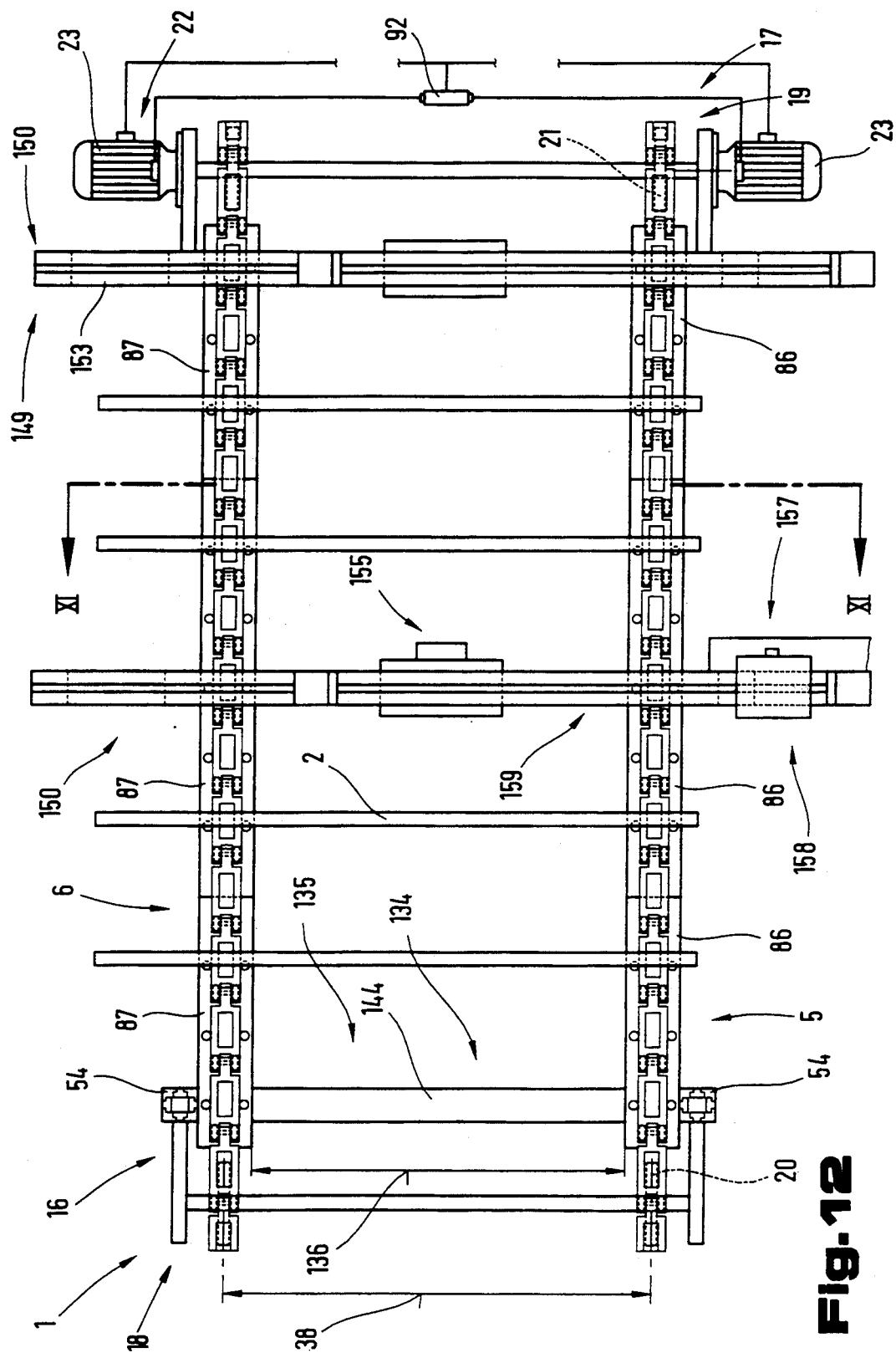

INSTALLATION FOR PROCESSING AND/OR ASSEMBLING COMPONENTS

BACKGROUND OF THE INVENTION

1. Field of the invention

The invention relates to an installation for processing and/or assembling components.

2. The Prior An

Installations of this type are basically manufactured as loosely concatenated or rigidly concatenated installations. In loosely concatenated installations, so-called workpiece carriers are moved along the installation completely independently of one another. In rigidly concatenated installations, the workpiece carriers are interconnected in their movement so that the positions of the workstations along the conveying device depend on the technical design of the conveying element. Each of the two types of installation has its own range of application, the rigidly concatenated installations being used where only a few workstations are concatenated installations since if faults arise in one workstation, all workstations arranged along the convey rag device must be blocked.

In order to achieve a high quality of manufacture when components are processed in such installations, precise guidance of the conveying element with the receptacles for the components is essential.

Rigidly concatenated installations are already known—from DE-OS 26 40 593—in which the individual workpiece carriers are connected by chain conveyers. Up until now, it has been difficult to series-produce such installations or to make them adaptable to varying requirements with a varying number of workstations. Moreover, it was difficult to install the processing devices. The further known rigidly concatenated installations for processing and assembling components are formed by rotary tables which may possibly also be Concatenated by way of additional conveying devices—e.g. according to DE-OS 31 34 195. Such rigidly concatenated installations, which may be formed by rotary tables, cannot subsequently be extended by adding extra workstations and take up a great deal of room, especially when a plurality of workstations are arranged in tandem. Furthermore, access, assembly and also maintenance are made difficult by the compact arrangement of the assembly and handling devices or processing device disposed inside the rotary table.

In a further known installation—according to WO 89/06177—of the same applicant, the conveying element can be formed by workpiece carders which are interconnected by chain-shaped joint arrangements forming a continuous strand, which is guided in a drive and rerouting station, and which forms thereby also a linear-oriented conveying device for components along which the workstations are arranged.

Due to the chain-shaped arrangement of the workpiece carriers next to one another, the conveying element has an increased mass, which is disadvantageous for acceleration processes, in particular at short cycle periods, and therefore, these installations are used particularly for small components and they can only be used to a certain extent for large, and in particular long components.

SUMMARY OF THE INVENTION

The object of the present invention is to provide an installation for processing and/or assembling components which can convey long components along workstations arranged in a row, and in which said components can be processed or assembled, and which is built in the form of a module and can be quickly adapted to process or assemble components of varying length and by which the necessary precision for the required task is achieved.

This object of the invention is achieved in that guidance devices of at least two conveying devices are arranged parallel to one another and at a preset distance, and that the guidance devices or the conveying devices are secured by connecting devices, in a direction extending transversely to the conveying direction, into a position at a distance from one another. The surprising advantage of this solution according to the invention lies in that with such an installation basically light but long components can be conveyed, which lie on parallel-running conveying devices or conveying elements of the conveying devices, in a direction transverse to the conveying device. The conveying elements may have a minimal mass, thereby allowing that inexpensive drives can be used for them. In addition, the connecting devices which are arranged between the conveying devices, make it possible to adapt these installations rapidly to components of different lengths, whereby short assembling periods can also be achieved.

An embodiment wherein each guidance device is associated with a supporting frame and the supporting frames are secured in a position to one another at a preset distance by means of connecting devices, is also possible, whereby a module structure is achieved which allows for high normalization of subassemblies and therefore, to a very large extent, makes these installations adaptable to the technical requirements of widely differing assembly tasks. This way, fully tested functional units may be very quickly combined to installations which handle very complex assembling and/or processing procedures.

An advantageous embodiment wherein the supporting frames are supported by support elements on a contact area, for example a table top, is also possible thereby creating conveying units which are built in a functional way by the manufacturer so that expensive in-situ end assembly can be avoided.

According to a further development wherein the support elements are supported by a platform-like base frame on a contact surface, the operator of such installations can economize on additional auxiliary constructions.

An embodiment wherein at least between one of the supporting flames and the support elements, or the support elements and the base frames in a direction extending transversely to the conveying direction, guidance devices, for example a linear slide unit is arranged, is also advantageous, because very few components are needed if base flames and vertical guideways are incorporated, which makes it possible to produce the installations at favorable cost.

According to a further development wherein the supporting frames are formed by a section extending lengthwise in the conveying direction, which presents the guidance devices, a very small manufacturing expenditure is achieved which provides high precision guidance and very good stability of the supporting frames with minimal use of material.

With a further development wherein the supporting flames consist of at least two housing parts of the same type, which are adjacent to one another in the conveying direction, a reduction of the component size is achieved thereby providing cost-effective production and high manufacturing precision.

An embodiment wherein the supporting frames on opposite surfaces present guidance devices for back and forth moving chain ends of the conveying elements, is also possible providing a smooth, vibrationless operation of the conveying elements which allows for high positioning precision.

A further development wherein the supporting frames in opposite end sections have a coupling and/or fastening device to link the housing parts which are directly adjacent, or the drive or reversing stations, is also advantageous because thereby identical parts can be produced as coupling or connecting elements at favorable cost.

According to another advantageous embodiment wherein the supporting frames have continuous assembly rails, for example T-shaped grooves, on their surfaces and/or side walls, fastening possibilities for the assembly and processing equipment are achieved, the set position of which with respect to the supporting frames does not have to be adjusted when the position of the supporting frame is changed.

An advantageous further development wherein the conveying element is formed by a continuous surrounding strap or chain etc. which connects the receptacles of the components in a detachable way, achieves high flexibility when these installations are adapted to different conditions of use.

Another possible further development wherein the guidance devices which are associated with the conveying element are formed by lateral and/or vertical guideways, achieves an adaptation to the different precision levels for guidance of the conveying element required in the various regions of the conveying devices.

An embodiment, wherein the lateral guideways are formed in the conveying direction by spaced-apart guide rollers which are arranged in parallel rows in the conveying direction, is also possible, and achieves long-wearing guidances.

Another embodiment wherein a connecting device, which positions the supporting frames at a distance from one another, is formed by at least one crossbeam having a preadjustable and/or predeterminable length, is also advantageous because a stable and swing-free connection can be achieved between the supporting frames, which, in addition, has the advantage that by varying the length of the crossbeam, the installation can be easily adapted to various component sizes.

An embodiment wherein the crossbeam is formed by a housing part is also possible because the crossbeams can be prefabricated through which, on the one hand high production precision can be achieved and on the other hand, enough supply can be produced in a cost-effective manner.

A further embodiment wherein the crossbeam has at least one guideway and/or holding device for handling devices, a single device marshaling component parts into singles, etc., is also possible so that additional components for guidance can be eliminated and at the same time, with respect to the guiding devices an orientation as to height can be predetermined in a precise way.

A further development wherein the guideway is extending at least between the conveying devices and transverse to the direction of conveyance of the conveying devices, is advantageous because thereby it is possible to arrange handling devices or processing stations between the conveying devices and assembly or respectively joining processes can also take place in this area.

An embodiment wherein a portal spanning over the two conveying devices transversely to the conveying device, is arranged on the supporting frames or the support elements, is also advantageous because it allows for stable construction of the portal frame which, in a simple manner, is adaptable to various purposes of use or assembling processes.

However, an embodiment wherein the portal and/or a portal support of the portal is protruding beyond the conveying devices transverse to the direction of conveyance is also possible, because it allows for supply devices disposed outside or more remote, to take up parts and to bring them into the precisely predetermined assembling or respectively processing position.

An embodiment wherein the portal support presents at least one guideway and/or holding device for handling and singling, devices etc., is also advantageous because there is no need for an additional arrangement of guiding devices which achieves cost savings.

According to an advantageous further development wherein at least one workstation is arranged on the portal support, it is possible to position individual workstations on the portal support in an exact way with respect to the components which are transported by the conveying devices.

A further development wherein at least one drive arrangement for a handling apparatus is arranged on the portal support, is also advantageous, because thereby it is possible in a simple manner to retrofit the installation for the supply and assembly of different component parts since the entire drive arrangement with the handling apparatus can be exchanged which, if faults arise, eliminates substantial expenditure for assembly and the production cycle is only shortly interrupted.

A further development wherein the supporting frames and/or the crossbeam and/or the support element and/or the portal post and/or the portal support are provided with holding elements such as T-shaped grooves, is also advantageous, because this way, a modular structure of the installation can be achieved and the individual parts among themselves can be secured to one another by the same parts.

According to a further advantageous development wherein the connection device positioning the supporting frames at a distance transverse to the conveying direction has an adjustment device formed by adjusting elements, for example threaded spindles, a combination of the functions of exact positioning to one another and also the adjustability and the use of less different components can be achieved.

By an embodiment wherein in the conveying direction at least two spaced-apart and parallel-running connection devices are arranged together with the adjustment devices, to which a common adjusting drive is associated, rapid adaptation of the installation to different distances between the conveying devices with a high precision of parallelism is achieved.

According to an advantageous further development wherein the adjustment device comprises a precision adjustment device, it is possible to provide a fast adjustment with a subsequent precise adjustment permitting to carry out the adjustment process in a fast manner.

According to another advantageous development wherein the adjusting elements which form the adjustment device, are formed by threaded spindles, which are positioned in one end region of the support frames in a movable manner and which cooperate with a coupling element formed as a traveling nut that is arranged in a movable manner in the other support frame, a cost-effective adjustment mechanism can be achieved by using high-quality components.

An advantageous further development wherein the traveling nut is formed by two parts in an axial direction and wherein the two parts are positioned to one another in a relatively adjustable manner in the axial direction, is also possible, which independently of the wear of the components achieves play-free cooperation so that inaccuracies concerning the parallelism of the axles are prevented.

If the adjusting drive of the adjustment device is formed by a drive shaft extending longitudinally in the conveying direction, which cooperates via a mitre gear with the adjusting elements of the longitudinal adjustment device, the use of standard components for the adjustment elements is achieved.

However, an embodiment wherein a drive, for example a manual wheel, an electromotor, a motor under pressure, etc., is associated with the drive shaft is also possible offering an adaptation to the most varying conditions of use by selecting the most economical variant.

According to an advantageous further development wherein the parallel running conveying devices or respectively conveying elements have a mutual drive device, for example an electric motor, in particular a servodrive with a set of gears, whereby the drive wheels for the conveying elements with an axle drive shaft are positioned in a movable manner and whereby in addition, at least one of the drive wheels can be positioned in a longitudinal displaceable manner in an axial direction of the axle drive shaft, high-quality synchronism is achieved by the mechanical coupling of the conveying elements by means of the axle drive shaft and high costs for servodrives can be saved.

An embodiment wherein each of the conveying devices comprises a drive device, which devices are interconnected via an electric synchronizing device, is also possible, whereby a mechanical coupling is eliminated and damages to the installation can be avoided by blocking one of the conveying devices.

According to an advantageous embodiment wherein the transducer of the synchronizing device is formed by an incremental transducer to determine the absolute value of the rotary motion and/or the swing angle of the drive arrangement, high precision in the synchronism is achieved and moreover, the possibility is created after an arising disturbance during which the conveying devices comes out of step, to carry out zero positioning in a simple manner.

An embodiment wherein the synchronizing drive is formed by a locking differential which is connected to a connection of a controlling device, which at its entry is connected with engine speed sensors, is also possible, whereby also in case of shortterm sudden increases of load, synchronism of the conveying devices is achieved.

According to an advantageous embodiment wherein the base frame consists of twist-proof sections, in particular of aluminum, wherein coupling elements are provided for the support elements of the conveying devices on a surface facing towards the conveying device, a conveying unit is achieved for the installation, which prevents dismantling of the installation after assembly before delivery with the reassembly taking place at the buyer's.

If the covering plates forming the surface of the base flames have an antiskid surface, for example of corrugated aluminum plates or plastic plates, a safe working platform for the operation of the installation is achieved.

An embodiment wherein the lateral edges of the base frames have coupling elements to couple base frames which are arranged adjacent to one another, is also advantageous, because several base frames or installations arranged thereon can be coupled to one another.

Finally, an embodiment wherein the base frame has support elements on its lateral edges, for example shackles embedded in the sections in order to fasten crane lifting bands, is also possible, because it enables safe conveyance of assembled installations from the manufacturer to the operator by different transportation means.

BRIEF DESCRIPTION OF THE DRAWINGS

For a better understanding of the invention, it is explained hereinafter in further detail, by way of example only, of the accompanying drawings, in which:

FIG. 3 is a top view of another embodiment of the installation according to the invention;

FIG. 4 is a front view of the installation, in a section taken along the lines IV—IV in FIG. 3;

FIG. 11 is a front view of another variant of an embodiment, in section, taken along the lines XI—XI in FIG. 12;

FIG. 12 is a top view of the installation according to FIG. 11.

DETAILED DESCRIPTION OF PREFERRED EMBODIMENTS

Figure 1:
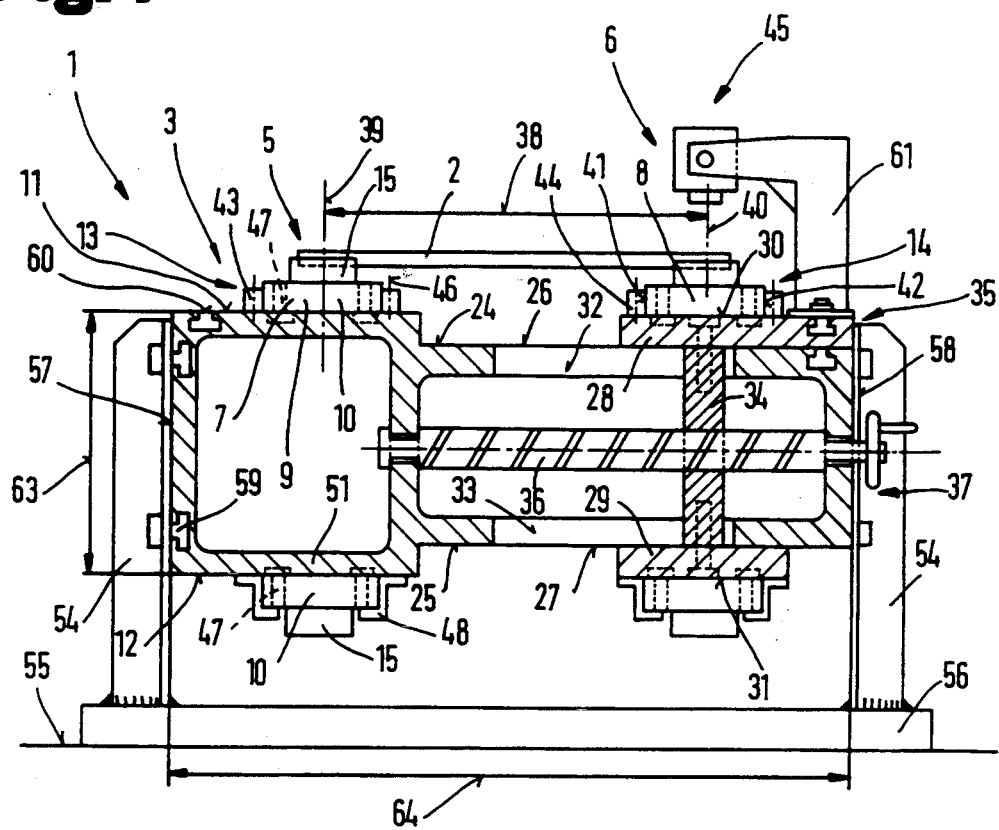
FIG. 1 is a front view of an installation according to the invention, in a section taken along the lines I—I in FIG. 2.
Figure 2:
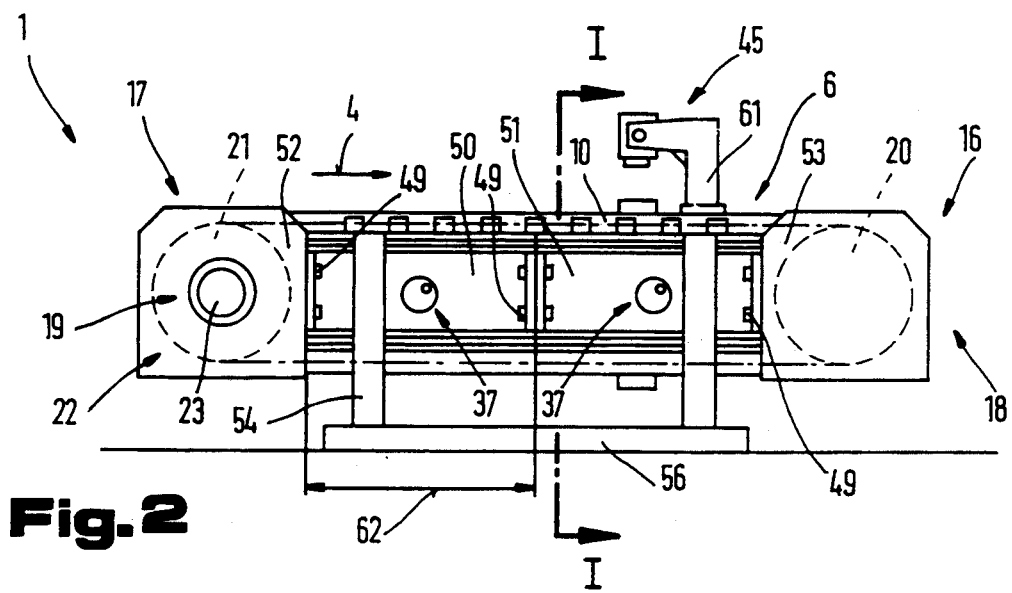
FIG. 2 is a side view of the installation.

FIGS. 1 and 2 show an installation 1 for processing and/or assembling components 2. To transport these components 2, disposed on a support frame 3 in the direction of conveyance—arrow 4—are conveying devices 5, 6, which extend parallel to one another. Conveying elements 7, 8 of the conveying devices 5, 6 consist of chain links 9 which are connected to one another in an articulated manner and form the workpiece carriers 10. For the latter, on the oppositely arranged surfaces 11, 12 of the supporting frame 3, guidance devices 13, 14 are disposed. Arranged on the workpiece carriers 10 are receptacles 15 for holding components 2, or are loosely connected to the workpiece carriers 10. In the end sections 16, 17 of the installation 1 are rerouting stations 18, 19 for the conveying elements 7, 8. These reversing stations 18, 19 present reversing wheels 20, 21, for example chain wheels. One of the reversing stations 18, 19, in the present example the rerouting station 19 for the drive of the conveying elements 7, 8, is associated with a feed drive 22, for example a servo-drive 23.

The supporting frame 3 presents in the region of the conveying device 6 with respect to the surfaces 11, 12 deeper lying surface regions 24, 25 which form guideways 26, 27 for adjustable mourning rafts 28, 29 running in the longitudinal direction of the installation 1 and transversely to the feed direction—arrow 4—and which form vertical guideways 30, 31 for the conveying element 8. The mounting rails 28, 29 are connected immovably to one another by spacers 34 which cross the supporting frame 3 in recesses 32, 33. Thus, a slide unit 35 for the conveying device 6 is created, which can be adjusted in connection with a turnable threaded spindle 36 disposed transversely to the feed direction—arrow 4—and located in the supporting frame 3, the spacer 34 having an inside thread with which the threaded spindle 36 cooperates. Thus, a connecting device 37 is achieved which permits that a distance 38 between the central longitudinal axes 39, 40 of the conveying devices 5, 6 can be continuously modified and adapted to the requirements of different components 2.

In addition to the vertical guideways 30, 31 the conveying elements 7, 8 are associated with guide rollers 43, 44 which act on the side faces 41, 42 of the workpiece carrier 10, by which an exact lateral guidance of the conveying elements 7, 8 is achieved, which, in particular, in the region of a workstation 45 is important for an appropriate manufacturing result. These guide rollers 43, 44 are positioned in a turnable way by means of swiveling axes 46 which run perpendicularly to the surface 11.

According to a known embodiment, the guide rollers 43 are spaced apart from one another in the drive direction—arrow 4—, and those guide rollers 43 which are associated with the side face 41 have non elastic bearing races and the guide rollers 44 associated with the opposite side face 42 have elastically deformable bearing races, therefore acting as so-called pressure rollers, so that in connection with the guide rollers 43 which have hard bearing races, a precise lateral guidance of the workpiece carrier 10 is achieved.

As is further known, the workpiece carriers 10 have rollers 47 supported on the vertical guideways 30, 31. On the underside of the supporting frame 3 angle brackets 48 are arranged on which the rollers 47 of the end of chains of the conveying elements 7, 8 are supported in their return course.

The supporting frame 3 is formed, for example, by several identical housing parts 50, 51 which, in the longitudinal direction of the installation 1, are touching each other and are interconnected by means of coupling and/or fastening devices 49, and the housing parts 52, 53 of the reversing stations 18, 19 have identically formed coupling and/or fastening devices 49.

The installation 1 which is formed by the housing parts 50 to 53, is supported on a contact surface 55 or respectively a base frame 56 by means of support elements 54. The support elements 54 are formed by L-shaped sections for example, which are disposed in a mirror-inverted manner relative to a vertical plane of symmetry and which are connected in the region of side walls 57, 58, i.e. screwed, to the housing parts 50 to 53. To this end, the side walls 57, 58 have assembly rails 59 running in the longitudinal direction, which are formed, for example, by T-shaped grooves 60. Such grooves 60 can also be provided in the surfaces 11, 12 and in the surface regions 24, 25, for example in order to fasten carrying elements 61 for processing, assembling and/or measuring equipment.

As is apparent in FIGS. 1 and 2, the housing parts 50, 51 have uniform dimensions such as a length 62, a height 63 and a width 64. Thereby, a seamless stringing together of the housing parts 50, 51 and also the replacement of individual housing parts 50 can be carried out easily and without problems. Through the continuous fastening device in the form of an assembly rail 59 it is also possible that during the replacement of the individual housing parts 50, 51, the directly adjacent housing parts can be supported by means of support elements 54 disposed on the base frame 56. A further advantage when using such continuous assembly rails 59 lies in the fact that the support elements 54 can be positioned at any selected place along the installation 1, thus not hindering the arrangement of workstations or that of the handling and feed equipment associated therewith. At the stone time, these continuous assembly rails 59 can also serve to fix the end position of feed equipment or handling devices, whereby they can be used for multiple purposes.

FIG. 3 shows the installation 1 in the region of the rerouting station 19 with a feed drive 22. The conveying elements 7, 8 laterally and vertically guided on the supporting frame 3 and the mounting rail 28, respectively are running parallel to one another, and the central longitudinal axes 39, 40 nd spaced a distance 38 from one another. On the conveying elements 7, 8, which form the workpiece carriers 10, recepticles 15 are secured in which the components 2 are held in position.

On a front face 65 of the supporting frame 3 or respectively the housing part 50, the housing part 52 of the reversing station 19 is fixed by means of fastening elements 66, such as screws for example. In the housing parts 52, drive shaft 69 is rotatably disposed bearings 67, 68, for example bearing housings with inserted rolling bearings, a central axis 70 forming a rotary, is running parallel to the front face 65 and the surface 11 of the housing part 50. In prolongation of the central axis 70, the servodrive 23 of the feed drive 22, which is flanged on one of the side faces 72 of the housing part 52, is coupled with a shaft butt 71 of the drive shaft 69. On the drive shaft 69, chain wheels 73 to 76 connected to one another in pairs and associated with the conveying elements 7, 8 are disposed, those chain wheels 73, 74 which being associated with the conveying element 7 by means of a wedging 77 are connected in an undisplaceable and torsion-free manner to the drive shaft 69. In the region of the conveying device 6 which is displaceable transversely to the feed direction—arrow 4—by means of a threaded spindle 36, the drive shaft 69 has a wedge tooth forming 78 along which, and thereby in the direction of the central axis 70, the chain wheels 75, 76, which are connected to form a pair via a sleeve 79, are positioned in a displaceable manner. By means of the wedge tooth forming 78 and a counter denticulation 80, the chain wheels 75, 76 are coupled in a torsion-proof manner to the axle drive shaft 69.

If, for retrofitting of the installation 1 for a component 2, the distance 38 has to be changed, the connecting device 37, that is, or respectively its threaded spindle 36 is operated by a manual wheel 81, whereby the spacer element 34 having an inside thread 82 and connecting the mounting rails 28, 29 acts as traveling nut 83, then the chain wheels 75, 76 are taken along due to their engagement in the conveying element 8 in the adjustment direction according to double arrow 84. Thus, the installation 1 can be rapidly adapted to components 2 of varying length 85 and without any expensive adjustment work.

If the mounting rail 28 has a groove 60 extending in the longitudinal direction of the installation 1 to fasten the carrying element 61 of a processing and/or assembling device, a readjustment is not required after such a modification of the distance 38.

Figure 5:
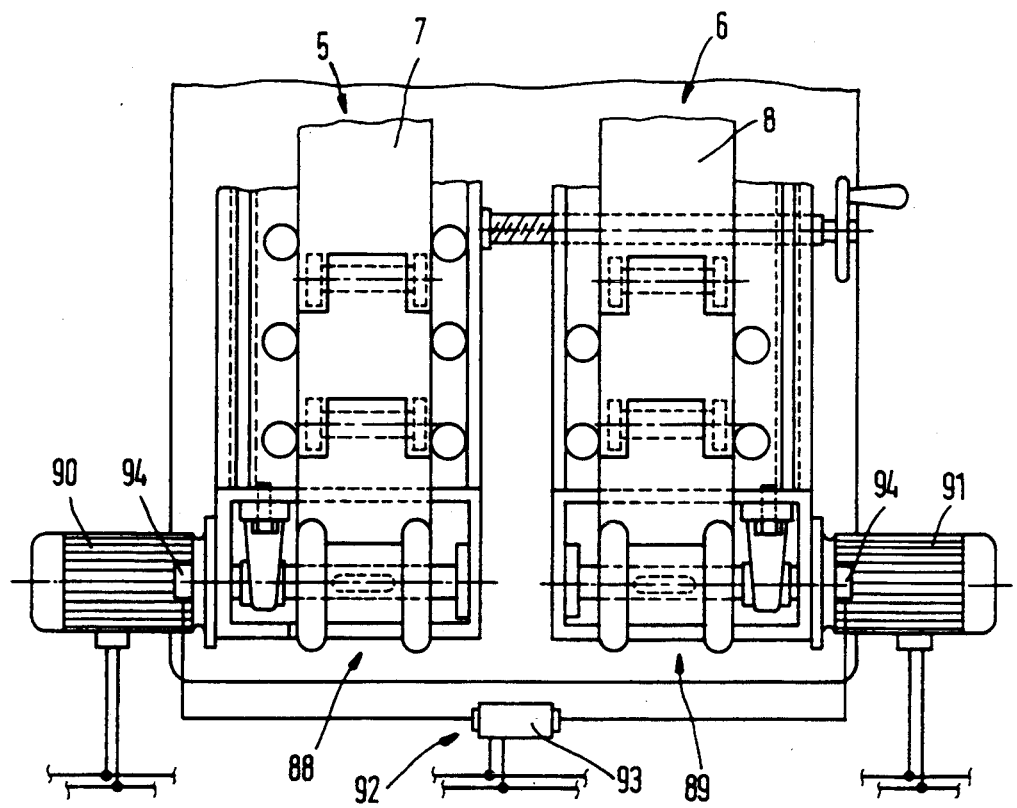
FIG. 5 is a top view of a further embodiment of the installation according to the invention.

FIGS. 4 and 5 show another embodiment of the installation 1. In this installation 1 the conveying devices 5, 6 have supporting frames 86, 87 which are independent from one another, and which in the longitudinal direction of the conveying devices 5, 6, if desired, can be formed by several housing parts. As already described, in the end section of the supporting frames, rerouting stations 88, 89 with chain wheels, etc., are arranged. The drive of the conveying elements 7, 8 takes place by one of the servodrives 90, 91 associated with the conveying elements 7, 8 in the reversing stations 88, 89, which servodrives are equipped with the adequate step down gear and which turn the engine speed into the appropriate feed velocity of the conveying elements 7,8 to operate the installation 1.

Instead of a mechanical coupling of the drives of the conveying elements 7, 8 a synchronizing device 92 is provided, which achieves an absolute synchronism of the conveying elements 7, 8. The synchronizing device 92 comprises a control device 93 in which data from sensors 94, which are located on the servodrives 90, 91, are monitored and processed, and which, should the occasion arise, trigger adjustment functions to ensure the synchronism of the conveying elements 7, 8. Sensors 94 may be measuring devices for the engine speed, torque, in particular absolute-value incremental measuring devices.

This way, a mechanical coupling is eliminated between the drives of the conveying elements 7, 8 in the form of a continuous drive shaft with the required coupling elements, thus preventing a play which influences the precision of the drive movement, which is brought about by tolerances in mechanical elements.

The conveying device 6 is adjustable relative to the conveying device 5 transversely to the feed device. Whereas the conveying device 5 is supported fixedly by support elements 54 on the base frame 56 and is secured to it by means of fastening elements 66, the conveying device 6 has between the supporting frame 87 and the base frame 56 a linear slide unit 95, which forms an adjustment area according to a double arrow 96. This way, and in connection with the connecting device 37 formed by the threaded spindle 36, which has already been described hereabove, the distance 38 between the central longitudinal axes 39, 40 of the conveying elements 7, 8 can be modified.

The linear slide unit 95 can be formed by different commercial guide units such as rollers, ball bearing guidances, etc. To determine the distance 38 to be set between the linear slide unit 95 and the base frame 56, a fastening device 97 is disposed, for example a tensioning screw 98, which passes through the linear slide unit 95 and engages in a sliding block 99 which is guided in a groove 100 of the base frame 56 that runs transversely to the feed direction. By means of the fixing device 97 an immovable fixing of an adjusted distance 38 can be achieved.

In order to maintain a precision adjustment of the distance 38 as indicated, in the region of the fixed position between the threaded spindle 36 and the supporting frame 86, a precision adjustment device 101 is arranged. This device has a sleeve-shaped receiving body 102 in which the threaded spindle 36 is positioned in a turnable manner and is adjustable by means of an outside thread 103, for example a fine-pitch thread located in a corresponding counter thread in the supporting frame 86. This way, it is possible to use the thread of the threaded spindle 36 for rapid adjustment, i.e. to provide it with a high lead to roughly preset the distance 38 and to carry out the precision adjustment by means of the precision adjustment device 101 which allows for a very exact distance setting.

Figure 6:
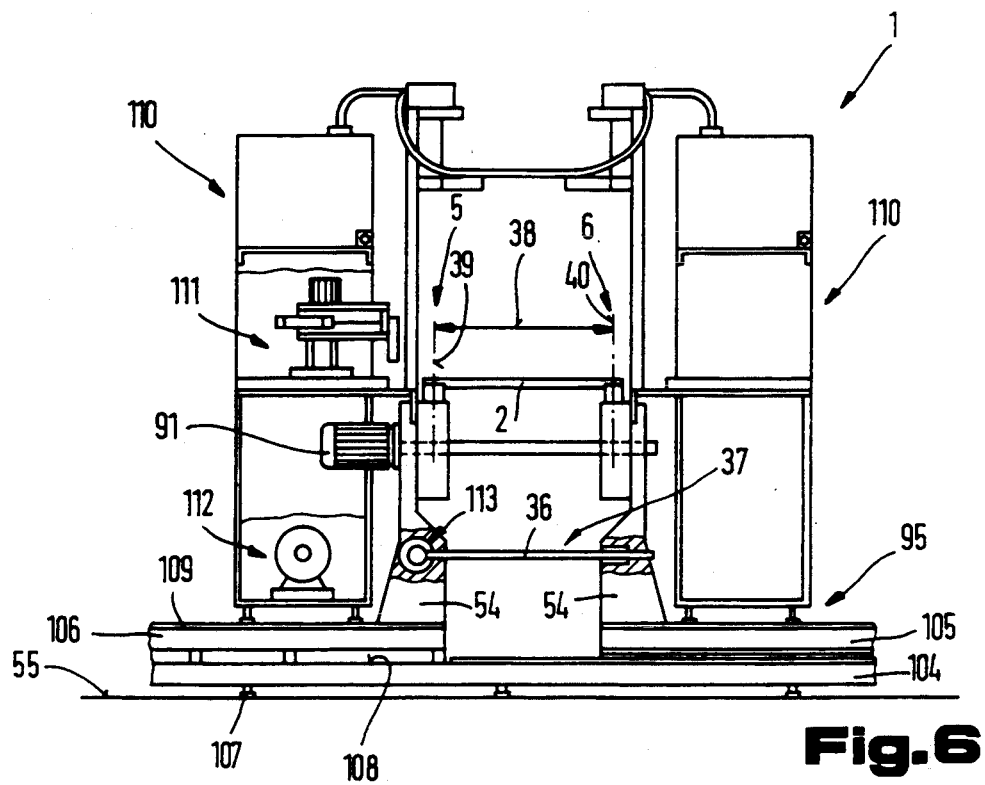
FIG. 6 is a front view of the installation according to the invention with a multiple base frame, partially cut.
Figure 7:
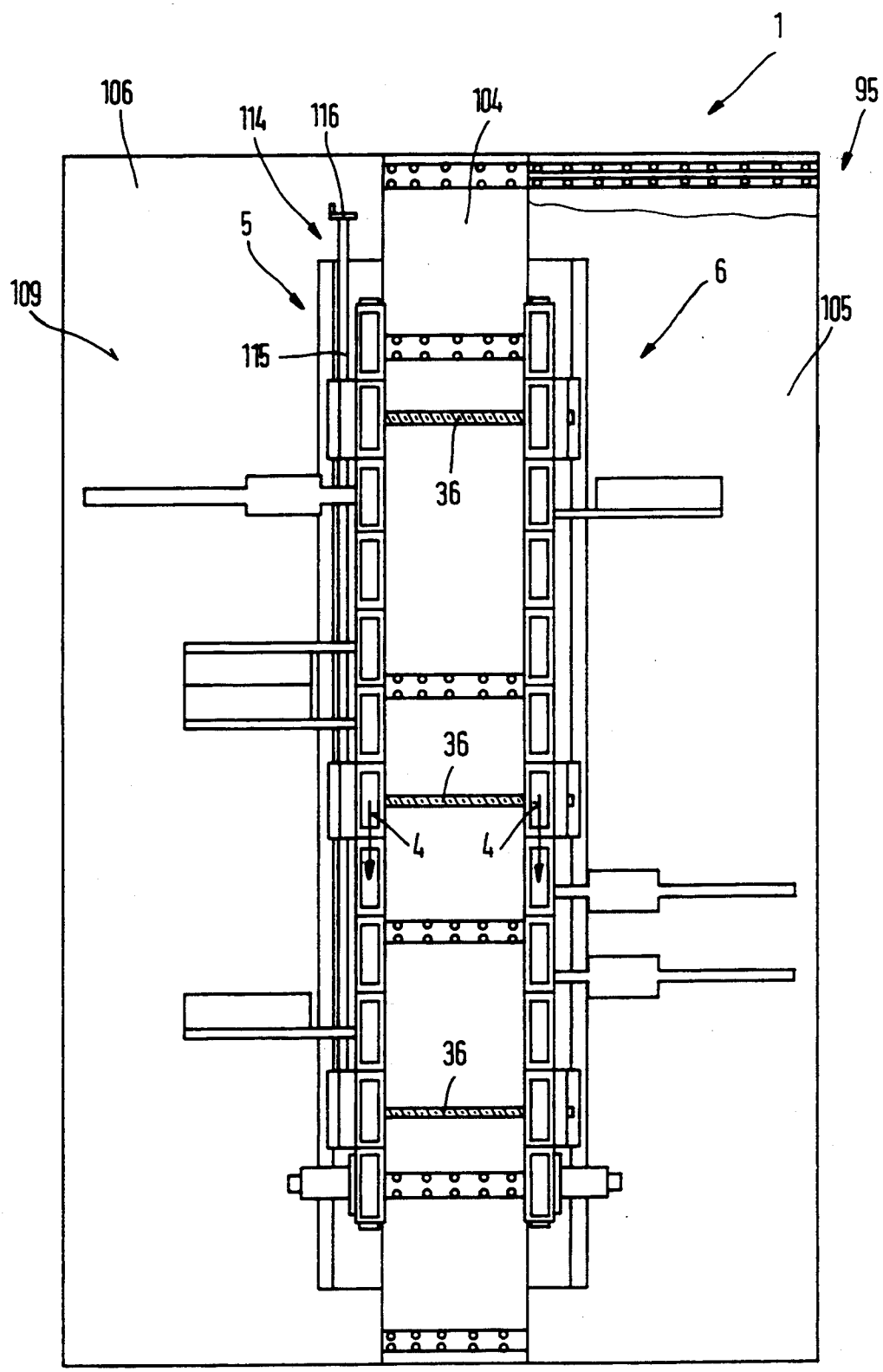
FIG. 7 is a top view of the installation.

FIGS. 6 and 7 show the installation 1 with parallel-running conveying devices 5, 6 and their arrangement on platform-shaped base flames 104, 105, 106. On the contact surface 55, for example the floor of the manufacturing hall, the base frame 104 is supported by spaced-apart and level-taking positioning elements 107. This frame consists for example of a frame construction of sections, which, in order to have less weight are in particular formed of light alloy sections. On this base frame 104, on a surface 108 facing towards the conveying device 5, the base frame 106 is fixed or is screwed on to it, which consists also of sections, has a cover plate 109, for example of corrugated aluminum sheet metal, and forms thereby a platform to receive the conveying device 5, the feed means 110, handling equipment 111, but also supply means 112, for example for compressed air, electric energy, etc.

The conveying device 6 running parallel to the conveying device 5 is also, with all its feed means 110, etc., positioned and secured to a platform-forming base frame 105, which forms the linear slide unit 95 for the conveying device 6. Transversely to the feed direction—arrow 4—are arranged at a distance from one another at least two threaded spindles 36 of the connecting device 37 which connect the support elements 54 of the conveying devices 5, 6. Associated with these threaded spindles 36 are drives 113 in the support element 54 of the conveying device 5 which is arranged locally opposite of the base frame 104, for example angular drives formed by bevel gears which permits that the threaded spindles 36 can be actuated together via an adjusting device 114 running parallel to the feed direction—arrow 4—. This adjusting device 114 comprises a rotably positioned drive shaft 115 running over the longitudinal extension of the conveying devices 5, 6, by means of which the drives 113 are operated. As indicated, the operation of the drive shaft 115 can be effected by a manual wheel 116. It is, however, also possible to actuate the drive shaft 115 by electromotive, pneumatic and hydraulic means.

When activating the adjusting device 114, the displacement of the conveying device 6 which is supported in an adjustable manner relative to the base frame 104 by means of the linear slide unit 95, is made possible in connection with the drives 113 and the threaded spindles 36 in order to set in this way the distance 38 between the central longitudinal axes 39, 40 for components 2 that vary in length.

By assembling the adjustable conveying device 6 together with the feed means 110, the handling equipment 111, the supply means 112, etc. on the base frame 105, an adjustment of the distance 38 is made possible without readjusting these auxiliary devices and also the workstations with respect to the conveying device 6 after such an adjustment. Thereby, very rapid adaptation of the installation 1 for machining, processing and-/or assembling of components 2 of varying length is achieved.

Furthermore, by means of the base frame 104 which the conveying devices 5, 6 have in common, a conveying unit is created through which the installation 1, after successful testing, which in most cases is carried out at the place of the supplier or the manufacturer of the installation, does not require any dismantling for transportation. Thereby, the subsequent expensive reassembly at the place of the operator of the installation becomes superfluous.

Figure 8:
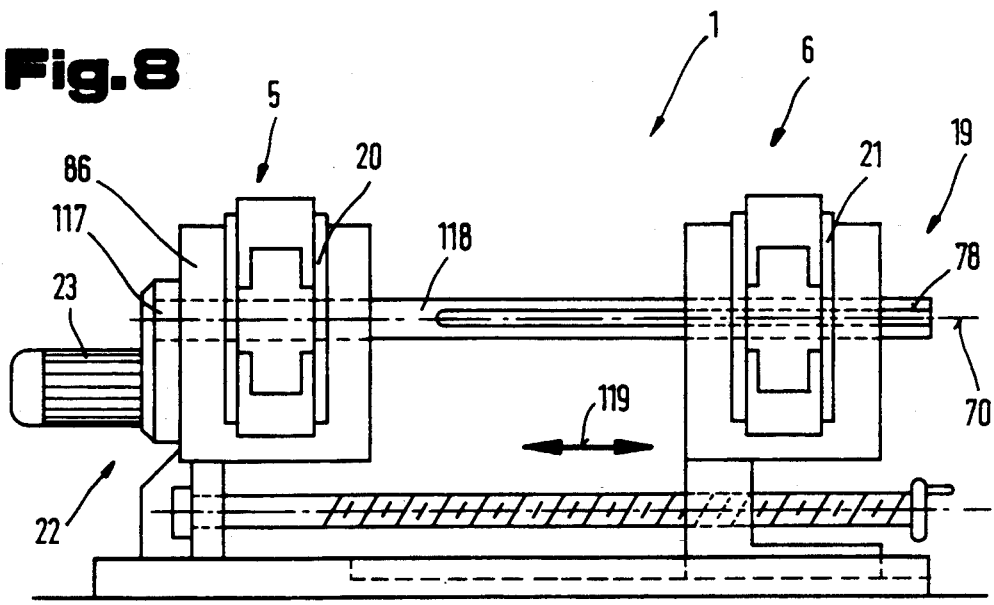
FIG. 8 is a front view of a drive arrangement of the installation according to the invention.
Figure 9:
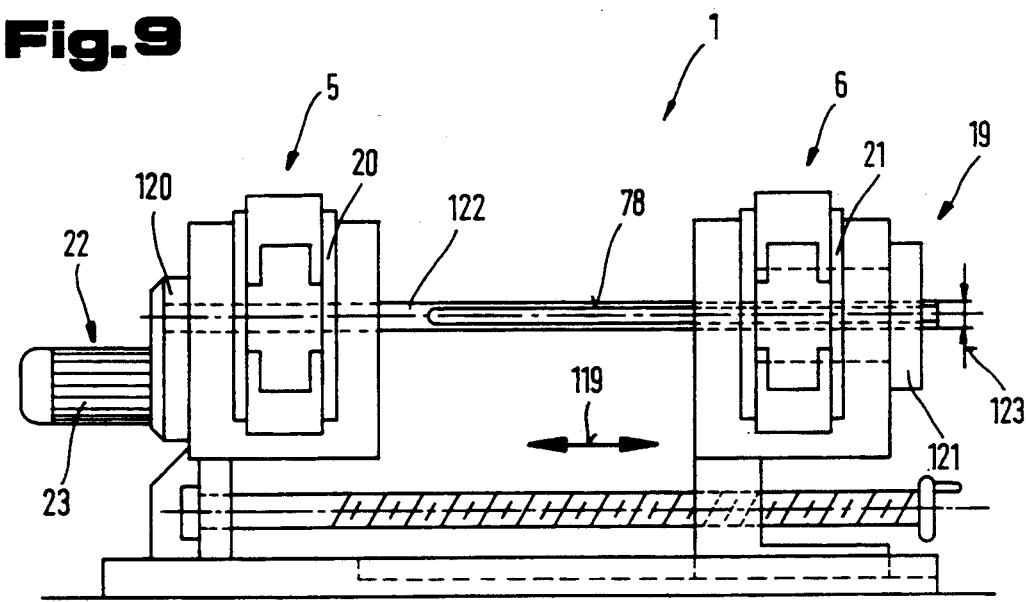
FIG. 9 is a front view of a further embodiment of a drive arrangement of the installation according to the invention.

FIGS. 8 and 9 show possible embodiments of the feed drives 22 of the installation 1. These feed drives 22 are provided for the mechanical coupling of the parallel-running conveying devices 5, 6 in the reversing station 19. Through the mechanical coupling, servodriving 23 actuates, the conveying device 5 and the conveying device 6 which is adjustable relative to the conveying device 5. As is apparent from FIG. 8, the servodrive 23 is flanged on the supporting frame 86 of the conveying device 5 and comprises a set of gears 117 to reduce the engine speed to the required drive speed, and reversing wheels 20, 21 are arranged in a torsion-proof manner on an axle drive shaft 118. The reversing wheel 21 associated with the conveying device 6 is adjustable on the drive shaft 118 in the direction of the central axis 70 along a double arrow 119. To this end, the axle drive shaft 118 comprises a spline 78 in the adjustment area.

On the other hand, as can be seen in FIG. 9, arranged directly upstream of each conveying device 5, 6 or respectively their reversing wheels 20, 21, is a set of gears 120, 121 which is designed in the form of a sun gear. Thereby, in contrary to the embodiment shown in FIG. 8, it is possible to form an axle drive shaft 122, which having a smaller dimension with respect to a diameter 123 due to its number of revolutions which correspond to the speed of the servodrive, transfers the required moment of torsion to drive both of the conveying devices 5, 6. Thereby, all in all, smaller dimensions are possible and lower forces of gravity are achieved, and the positioning behavior of the installation 1 or respectively the workpiece carrier 10 in cycle operation is improved. Also, in this embodiment, the axle shaft drive 122 comprises a wedge tooth forming 78 for the adjustment of the conveying device 6 relative to the conveying device 5.

Figure 10:
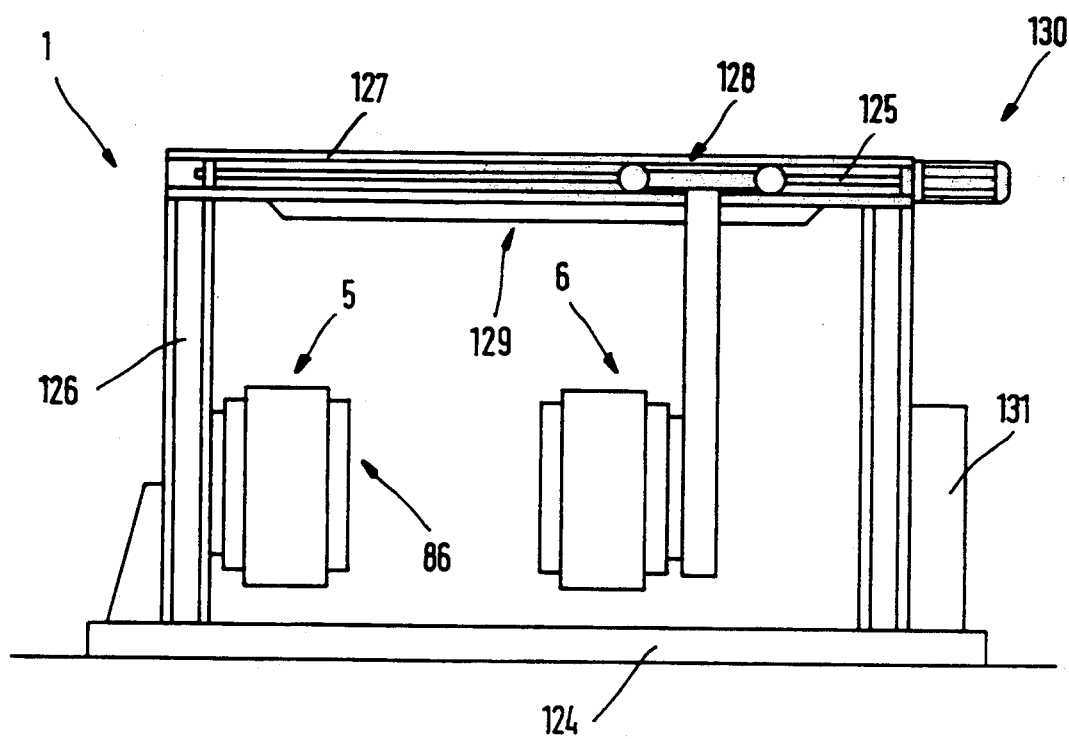
FIG. 10 is a front view of an installation with overhead construction according to the invention.

FIG. 10 shows a further embodiment of the installation 1 provided with the conveying devices 5, 6. The latter is designed in a so-called overhead construction, a portal frame 125 spans over the conveying devices 5, 6, and the conveying device 5 with its supporting frame 86 is secured to one or several posts 126, which are arranged at a distance from one another in the conveying direction. The parallel-running conveying device 6 is arranged in a suspended manner and comprises running gear 128 guided in a crosshead 127 of the portal frame 125, similarly to a suspended conveyer of a crane. With running gear 128, the conveying device 6 is adjustable transverse to the conveying device 5. This adjustment by means of the running gear 128 can take place manually by suitable drives or also by motor.

By the use of measuring devices 129, for example a ruler, an electrooptical measuring device, resistance measuring device, etc. together with mechanical drive devices such as spindle drives 130, an automatic method can be achieved by a central control device 131, for example an NC-unit, when retrofitting the installation 1.

FIGS. 11 and 12 show another embodiment of the installation 1 for processing and/or assembling components 2. To transport these components 2, disposed on the supporting flames 86, 87 in the direction of conveyance are two conveying devices 5, 6 which extend parallel to one another and which are formed by conveying elements 7 and 8 and consist of chain links 9 connected to one another in an articulated manner, which form the workpiece carriers 10. For the latter, disposed on the oppositely arranged surfaces 11, 12 of the supporting frames 86, 87 are guidance devices 13, 14. Disposed on the workpiece carriers 10 are receptacles 15 for holding components 2, which are detachably connected to the workpiece carriers 10. In the end sections 16, 17 of the installation 1 rerouting stations 18 and 19 are arranged for the conveying elements 7 and 8. These rerouting stations 18 and 19 have reversing wheels 20, 21, for example chain wheels. For the drive of the conveying elements 7, 8 one of the rerouting stations 18, 19, is associated with the feed drive 22, for example a servodrive 23.

As shown, each of the conveying devices 5, 6 is associated with its own servodrive 23. The two servodrives 23 are connected to a synchronisation device 92 which is a part of the control device 93. One of the servodrives 23 is the master drive and the other is the slave drive. However, there can also be a mechanical connection, which is formed as an axle between the fevers rag wheels 20, 21, for example chain wheels. This embodiment ensures that the two conveying devices 5, 6 are moving in exact synchronization, and by means of an overload protection in the control device 93 makes sure that conveying devices 5, 6 stop if one of them breaks down.

To secure the two supporting frames 86, 87 at a preset and/or predetermined distance 38 from one another, transversely to the direction of conveyance between the inner side faces 132, 133 facing towards each other, a connecting device 134 is arranged which is formed as a crossbeam 135. By changing the length 136 of the crossbeam 135 diagonally to the conveying direction, it is possible to change in a simple manner the distance 38 between the conveying devices 5, 6 according to varying preset or respectively predetermined values.

Furthermore, due to the modular type of construction of the supporting frames 86, 87 and also the crossbeam 135, it is possible to adapt not only the length of the installation in the conveying direction but also the distance 38 transversely to said direction to the different conditions of use, such as different lengths of components. This can also be achieved by the fact that on the inner side faces 132, 133 as well as on the outer side faces 137, 138, holding elements 139, such as T-shaped grooves 60 are arranged at a distance 140 from one another. In the crossbeam 135 are also holding elements 139, which can also be formed by T-shaped grooves arranged transversely to the conveying direction and at a distance 141 from one another. In this modular construction it is advantageous if the distance 141 corresponds to the distance 140 in the supporting frames 86, 87.

Thus, it is now possible to secure faces 142, 143 of the individual crossbeams 135 to the inner side faces 132, 133 of the supporting frames 86, 87 to them, by screwing them on, for example. To facilitate the assembly it is of course also possible to arrange guide bars on the faces 142, 143 of the crossbeams 135 in order to achieve a precise alignment as to height between the holding elements 139 of the supporting frames 86, 87 and the holding elements 139 arranged in the crossbeam 135.

To align the heights of the supporting frames 86, 87 which are connected to one another by the crossbeam 135, support elements 54 are secured to the outer side faces 137, 138 in order to align this unit and to support it in a precise manner relative to the contact surface 55.

It is possible to secure to the holding elements 139 of the crossbeam 135, which can be formed as housing part 144 for example, as schematically indicated, by way of fastening means 145, such as screws with tenon blocks, a holding device 146 for a handling apparatus 147. Care must be taken when arranging the holding device 146 that it is aligned as to height in order to prevent in a safe way that the components 2 which are moved by the conveying devices 5, 6 do not collide. It is of course also possible to build the holding elements 139, which are arranged in the crossbeam 135, as guideways 148 in order to achieve an exact transverse movement of the handling equipment 147 relative to the conveying direction.

As can be seen best in FIG. 11, the installation 1 has spanning over the two conveying devices 5, 6 a holding device 149, which, having the form of a portal 150 consists of portal posts 151,152 and also a portal support 153 connecting the two portal posts 151, 152 to one another in a transverse direction with respect to the conveying direction. The connection of the portal 150 with the conveying devices 5, 6 or respectively its support element 54 can take place, as shown in the example of the portal post 151 in such a manner that it is directly connected to the support element 54 by means of fastening elements embedded in the holding elements 139. However, it is also possible, as shown in the example of the portal post 152, to secure the latter with respect to the conveying device 6 by means of spacers 154, which are arranged transversely to the conveying direction and between the support element 54 and the portal post 152. This adjustment transverse to the conveying direction is caused by the component 2 protruding beyond the conveying device 6.

Furthermore, it is possible to arrange a workstation 155 secured to the portal support 153 for the handling apparatus 147 secured to the crossbeam 135, which, together with the handling apparatus 147 carries out automatic operating processes, such as fastening, riveting and joining processes. To feed the workstation 155 with component parts 156 as schematically indicated, which by means of a device marshaling them into singles 157, also shown schematically, are brought into the region of the installation 1, it is possible to use said workstation by means of a further handling apparatus 158 of workstation 155 for further processing steps. In addition, the handling apparatus 158 consists of a drive arrangement 159, which can be formed by cylinder-piston arrangements, linear drives or spindle drives and may be fixed to the portal support 153.

The handling apparatus 158 takes up the component parts 156 provided by the singling device 157 and transports them thereafter by way of the drive arrangement 159 into the region of the workstation 155, whereby the handling apparatus 158 is handing over the component part 156 to said station. Thus, it is possible in a simple manner to arrange in the direction of conveyance of the installation 1, several portals 150 with differently equipped handling apparati 158, drive arrangements 159 and workstation 155, which makes it possible that several operating or joining processes can successively take place in cycles.

Due to the modular construction, in particular the holding elements 139, it is possible to connect the individual components among themselves in a simple manner, which achieves a variable assembly of the installation 1.

For a better understanding of the invention, partially diagrammatic illustrations have been selected and individual parts and elements are unproportionally shown.

It is, of course, also possible within the scope of the invention, in addition to the shown embodiments, to modify the arrangement of the individual elements in any way desired or to combine them differently. Individual features of the shown embodiments can also form their own solution in accordance with the invention.

What is claimed is:

1. An installation for processing and/or assembling components, which comprises
   (a) a housing unit including
      (1) a plurality of adjacent housing parts of identical construction,
      (2) chain conveyor guiding stations at respective ends of the housing unit, and
      (3) coupling devices for interconnecting the housing parts and guiding stations in alignment with each other,
   (b) support elements for supporting the housing unit on a contact surface,
   (c) at least two conveying devices arranged parallel to one another at a preset distance, and a guidance device associated with each conveying device,
      (1) each conveying device comprising a driven chain conveyor which consists of workpiece carriers forming chain links of the chain conveyor, each workpiece carrier being equipped with receptacles for the components, and
      (2) each guidance device comprising vertical guideways for the associated chain conveyor, the vertical guideways extending parallel to an upper side of the housing parts along the housing unit for vertically guiding the workpiece carriers, and guideways extending parallel to the vertical guideways on the upper side of the housing parts for laterally guiding the workpiece carriers, the guideways comprising guide rollers spaced apart from one another along the guideways, the guide rollers being supported for rotation on rotary axes extending substantially perpendicularly to the upper sides of the housing parts,
   (d) connecting means securing the conveying devices to each other in a direction extending transversely to a conveying direction, and
   (e) synchronous drive means for driving the conveying devices in the conveying direction.

2. The installation of claim 1, wherein the housing unit comprises supporting frames for the conveying devices.

3. The installation of claim 2, wherein the supporting frames are provided with holding elements.

4. The installation of claim 2, wherein the chain conveyor guiding stations consist of several reversing stations.

5. The installation of claim 1 comprising a platform-like base frame on the contact surface, the support elements being supported on the base frame.

6. The installation of claim 2, further comprising guide means arranged for guiding one of the supporting frames in a direction extending transversely to the conveying direction.

7. The installation of claim 6, wherein the guide means is a linear slide unit.

8. The installation of claim 1, wherein the housing unit has a section extending lengthwise in the conveying direction and supporting the guidance devices.

9. The installation of claim 1, wherein each guidance device comprises guide rails on an upper side of the housing parts for vertically guiding the workpiece carriers in an upper course of the chain conveyor, and guide rails at a lower side of the housing parts for vertically guiding the workpiece carriers in a lower course of the chain conveyor, the guiding stations guiding the chain conveyor between the upper and lower chain courses.

10. The installation of claim 1, wherein the housing parts and guiding stations have facing end plates, and the coupling devices interconnect the end plates.

11. The installation of claim 1, wherein the housing parts have continuous assembly rails on their surfaces.

12. The installation of claim 11, wherein the assembly rails are formed by T-shaped grooves.

13. The installation of claim 1, wherein the connecting means comprises at least one crossbeam having a preadjustable length.

14. The installation of claim 13, wherein the crossbeam is provided with holding elements.

15. The installation of claim 13, wherein the crossbeam is formed by a housing part.

16. The installation of claim 15, further comprising a component handling device, and the crossbeam has at least one guideway for the handling device.

17. The installation of claim 16, wherein the guideway extends at least between the conveying devices and transversely to the conveying direction.

18. The installation of claim 15, further comprising a component handling device, and the crossbeam has at least one holding device for the handling device.

19. The installation of claim 1, further comprising a portal spanning over the conveying devices transversely to the conveying direction.

20. The installation of claim 19, wherein the portal protrudes beyond at least one of the conveying devices transverse to the conveying direction.

21. The installation of claim 20, further comprising a portal support for the protruding portal.

22. The installation of claim 21, wherein the portal support is provided with holding elements.

23. The installation of claim 21, further comprising at least one workstation arranged on the portal support.

24. The installation of claim 21, further comprising at least one drive arrangement for a component handling device arranged on the portal support.

25. The installation of claim 1, wherein the support element is provided with holding elements.

26. The installation of claim 1, wherein the connecting means comprises an adjustment device adjusting the distance between the conveying devices.

27. The installation of claim 26, wherein the adjustment device comprises a threaded spindle.

28. The installation of claim 27, wherein the housing unit comprises supporting frames for the conveying devices, and the threaded spindle is rotatably mounted in one of the supporting frames and cooperates with a traveling nut movably arranged in the other support frame.

29. The installation of claim 26 comprising at last two of said adjustment devices spaced apart in the conveying direction and arranged parallel to each other, and a common adjusting drive connected thereto.

30. The installation of claim 27, wherein the adjustment device comprises a precision adjustment means.

31. The installation of claim 29, wherein the adjusting drive comprises a drive shaft extending longitudinally in the conveying direction and cooperating via a miter gear with the adjustment device.

32. The installation of claim 1, wherein the conveying devices comprise drive wheels, and the synchronous drive means comprise a common drive device including a rotatable drive shaft, the drive wheels being keyed to the drive shaft for rotation therewith, and at least one of the drive wheels being longitudinally displaceable in an axial direction of the drive shaft.

33. The installation of claim 1, wherein the synchronous drive means comprises a drive device for each conveying device, and an electric synchronizing device interconnecting the drive devices.

34. The installation of claim 33, wherein the synchronizing device comprises an incremental transducer to determine the absolute value of a rotary motion of the drive means.

35. The installation of claim 33, wherein the synchronizing device comprises an incremental transducer to determine the absolute value of a swing angle of the drive means.

36. The installation of claim 33, wherein each drive device comprises a servodrive, and the synchronizing device comprises a control including speed sensors having inputs connected to the servodrive and outputs connected to a control device.

37. The installation of claim 1, wherein the housing unit comprises twist-proof base frame sections, and further comprising coupling elements for the support elements of the conveying devices on a surface facing towards the conveying devices.

38. The installation of claim 37, further comprising covering plates on a surface of the base frame sections, the surface being provided with an anti-skid surface.

39. The installation of claim 37, further comprising coupling elements to couple lateral edges of the base frame sections which are arranged adjacent each other.

* * * * *